(12) United States Patent
Russell

(10) Patent No.: US 6,948,255 B2
(45) Date of Patent: Sep. 27, 2005

(54) COMMUNICATION METHOD AND COMMON CONTROL BUS INTERCONNECTING A CONTROLLER AND A PRECISION MEASUREMENT ASSEMBLY

(75) Inventor: Gary W. Russell, East Greenwich, RI (US)

(73) Assignee: Hexagon Metrology, AB, Naka Strand (SE)

( * ) Notice: Subject to any disclaimer, the term of this patent is extended or adjusted under 35 U.S.C. 154(b) by 22 days.

(21) Appl. No.: 10/479,295

(22) PCT Filed: Jun. 11, 2002

(86) PCT No.: PCT/IB02/02154

§ 371 (c)(1), (2), (4) Date: Nov. 26, 2003

(87) PCT Pub. No.: WO02/101323

PCT Pub. Date: Dec. 19, 2002

(65) Prior Publication Data

US 2004/0172215 A1 Sep. 2, 2004

Related U.S. Application Data

(60) Provisional application No. 60/297,480, filed on Jun. 12, 2001.

(51) Int. Cl.$^7$ ............................................. G01B 5/008
(52) U.S. Cl. ......................................................... 33/503
(58) Field of Search ........................................... 33/503

(56) References Cited

U.S. PATENT DOCUMENTS

| | | | |
|---|---|---|---|
| 5,402,582 A | | 4/1995 | Raab .............................. 33/503 |
| 5,615,489 A | * | 4/1997 | Breyer et al. .................. 33/503 |
| 5,634,060 A | * | 5/1997 | Jennings ...................... 710/241 |
| 6,158,136 A | * | 12/2000 | Gotz et al. ..................... 33/503 |
| 6,317,646 B1 | | 11/2001 | de Caussin et al. ......... 700/173 |
| 6,543,150 B2 | * | 4/2003 | Matsumiya et al. ........... 33/503 |
| 6,587,810 B1 | * | 7/2003 | Guth et al. ..................... 33/503 |
| 2003/0019119 A1 | * | 1/2003 | Sato et al. ...................... 33/503 |
| 2003/0081391 A1 | * | 5/2003 | Mowery et al. ............. 361/764 |

* cited by examiner

*Primary Examiner*—G. Bradley Bennett

(57) ABSTRACT

The number and weight of wires interconnecting a host and/or controller with a precision measurement assembly is reduced using a common or shared bus. The bus may be entirely electrical or may include optical fibers to reduce EMI susceptibillty. A custom bus or a known serial network bus such as CAN or SIRCOS may be used.

19 Claims, 3 Drawing Sheets

COMMUNICATION METHOD AND COMMON CONTROL BUS INTERCONNECTING A CONTROLLER AND A PRECISION MEASUREMENT ASSEMBLY

CROSS-REFERENCE TO RELATED APPLICATION

This as the national stage of International Application No. PCT/IB02/02154, filed Jun. 11, 2002, as amended on Jan. 10, 2003, which was published in English Dec. 19, 2002, under International Publication No. WO 02/101323 A2 and republished in English Jun. 12, 2003 under International Publication No. WO 02/101323 A3 with the amendment of Jan. 10, 2003 and which claims priority from U.S. Provisional Application Ser. No. 60/297,480, filed Jun. 12, 2001.

BACKGROUND OF THE INVENTION

1. Technical Field

The present invention relates to precision measurement tools and, more particularly, to a shared control bus between a host and a precision measurement assembly.

2. Discussion of Related Art

Precision measurement tools include coordinate measuring machines (CMM), precision measuring instruments and the like. CMMs range from bench top and articulated arm manual CMMs to high-speed DCC scanning machines, gantries, shop floor measuring robots and horizontal arm CMMs complete with metrology software, probes and accessories with support networks.

For instance, FIG. 1 shows a precision measurement assembly 10 in the form of a vertical CMM, according to the prior art. The assembly includes a stationary platform 12 and primary or first a movable part 14 mounted thereon. In the case illustrated of a vertical CMM, the first movable part 14 takes the form of a bridge which bridges the platform 12. Further configurations such as horizontal CMMs, the first movable part will typically take another form such as simply a vertical column. In any event, for the illustrated case of a vertical CMM, an actuator is mounted either on the platform 12 or the bridge 14 for moving the bridge 14 with respect to the platform along an axis such as an axis 15 parallel to one of the edges of the platform 12. The bridge 14 may also typically have one or more other movable parts such as a second moveable part or carriage 16 which is actuated by a corresponding actuator mounted on the carriage 16 itself or on the bridge 14. The carriage 16 may be moved along an axis such as an axis 17 perpendicular to the axis 15. One of these carriages 16 will have a probe 18 mounted thereon for being moved along a surface of an object situated on the platform. A probe axis 19 may be perpendicular to both the axes 15, 17 and the carriage 16 may be moved by an associated actuator along the axis 19. The various actuators execute controlled movements of the at least one carriage 16 and the bridge 14 so as to cause the probe to move relative to the surface of the object to be measured along a preplanned path. There are a number of position sensors associated with the carriage 16, bridge 14 and platform 12 for sensing the position of the bridge relative to the platform and the carriage 16 relative to the bridge and for providing signals having magnitudes indicative thereof. Similarly, the probe 18 is associated with a position sensor which provides a signal having a magnitude indicative of the position of the tip of the probe 18 relative to the carriage 16, e.g., along an axis 19 of the probe or carrier.

Various coordinate transformations may be carried out to translate the position of the probe into a surface map of the object to be measured. The surface of the object is of course known to a large degree in advance on account of a CAD program or the like stored in a host CPU 22 having a display 24 and user input device 26 such as a keyboard and/or mouse. The user will utilize the preexisting CAD representation of the object to be measured using a software interface program to create the preplanned path along which the probe 20 is to be moved. The objective is to measure the surface of the object with great precision. Such a host CPU may be connected to the precision measurement assembly directly or a via a controller 28 containing relays, power supplies, and other hardware which would not normally be present in a host CPU and which would be better situated separate from the precision measurement assembly 10. Such a controller might be connected to the host CPU 22 by means of an RS 232 interface 32, one or more twisted pairs comprising an ethernet connection 34 and/or any generalized connection symbolized by the reference numeral 30. One of the disadvantages of having the controller separate from the precision measurement assembly 10 is that numerous wires 36 have to be utilized to interconnect the controller to the precision measurement assembly 10, particularly the bridge or other equivalent first moveable part. In a typical example, there might be numerous temperature sensors mounted on the precision measurement assembly which have to be connected to the controller 28 by as many as 20 wires as shown. Similarly, other types of devices such as multiple motors, servos, encoders, probes and switches may be associated with the precision measurement assembly and need to be connected electrically to the controller 28 by means of wires. Also, a power supply within the controller 28 has to provide power on additional wires which may be of fairly heavy gauge to the precision measurement assembly 10. All these wires add up to a significant number. In the example shown, a total number of wires of 113 is required. These wires are heavy and have to be enclosed within a flexible conduit called an energy track which is designed to smoothly uncoil and coil the wires as the bridge 14 moves with respect to the platform 12. This energy track is normally situated on one of the sides of the platform 12 at one end of the first moveable part 14, in this case the bridge 14.

The large number of wires creates a significant cable drag problem in view of the fact that even the very slightest twist in the bridge caused by such drag will cause a deformation from the mathematical model of the ideal system to such an extent that a significant imprecision in the measurement is introduced. It is also the case that the controller itself 28 is typically designed in the present state of the art according to a fairly obsolete bus architecture (ISA) and it will be desirable to modernize the controller itself. Another problem is limited servo performance which it will be desirable to improve.

DISCLOSURE OF INVENTION

An object of the present invention is to reduce cable drag in the energy track between the controller or host and the precision measurement assembly.

Another object of the present invention is to improve servo performance and provide a modern bus architecture.

According to a first aspect of the present invention, an apparatus is provided, comprising (1) a precision measurement tool having a stationary platform and a first movable part for moving a probe along a surface of an object situated on the platform wherein an actuator for moving said first moveable part is mounted on said platform or first moveable part and plural actuators are mounted on said first moveable part for moving said probe, (2) a plurality of position sensors mounted on said platform and said first moveable part for providing sensed position signals having magnitudes which together are indicative of a position of said probe on said surface, and (3) a controller physically connected to the measurement tool by means of a bundle of signal lines for communicating actuator control signals from the controller to the actuators and sensed position signals from the position sensors to the controller, wherein the apparatus is characterized in that the bundle of signal lines comprises a common bus shared by the sensed position signals and the actuator control signals.

According to a second aspect of the invention, a method for use in communicating control and data signals between a controller and a probe movable along a surface of an object for making physical contact with the surface of the object mounted on a platform part of a measurement assembly and wherein the probe is movable by a first moveable part of the measurement assembly, comprises the steps of (1) utilizing a common control bus interconnecting said controller and a plurality of modules including modules mounted on said first moveable part for communicating said control and data signals over said common control bus by (2) transmitting a command signal from said controller over said common control bus for use by a plurality of actuator modules to actuate corresponding actuators for moving said first moveable part and said probe in multiple axes according to said command signal for moving said probe in continuous contact with said surface along a path on said surface for providing a data signal having a magnitude indicative of said probe making contact with said surface at selected points along said path on said surface of said object to a probe module, (3) providing a plurality of sensed position signals from a corresponding plurality of position sensor modules, said plurality of sensed position signals having magnitudes indicative of positions of said points contacted by said probe along respective axes of said multiple axes of movement of said probe, and (4) communicating said data signal and said sensed position signals over said common control bus from said probe module and said position sensor modules to said bus for use by said controller in recordation of said sensed data signal.

According to a third aspect of the present invention, an apparatus, comprises (1) a platform for supporting an object mounted thereon for measurement of a surface thereof, (2) a probe for moving in multiple axes along a path on the surface of the object for providing a sensed signal having a magnitude indicative of physical contact with said surface as well as positions of said points along said path along an axis of said probe, (3) a first moveable part movable on said platform for said moving the probe along at least one of said multiple axes along said path, (4) a probe module, responsive to said sensed signal for providing said sensed signal to a shared bus according to a preselected protocol, (5) a plurality of actuator modules including a corresponding plurality of probe actuators mounted on said first moveable part, responsive to respective probe actuator control signals provided according to said protocol on said shared bus, for moving said probe on said first moveable part along said path, (6) at least one first moveable part actuator, responsive to a first moveable part actuator signal, for moving said first moveable part on said platform for said moving said probe in said at least one of said multiple axes along said path, (7) a plurality of position sensor modules connected to a corresponding plurality of position sensors for providing sensed position signals on said shared bus according to said protocol having magnitudes indicative of positions of said points contacted by said probe during movement of said probe along said path, and (8) a controller for executing a stored program for providing said respective probe actuator control signals and said first moveable part actuator signal and responsive to said sensed position signals over said shared bus according to said preselected protocol for storing said sensed signals together representing a topological map of said surface.

According further to the first, second and third aspects of the invention, the sensed position signals are provided over the bus for comparison to a corresponding one or more of the actuator control signals.

In further accord with the first, second and third aspects of the invention, the shared bus comprises a transmit line and a receive line. The interconnections of the transmit line and the receive line and is made at least in part by optical fibers.

In still further accord with the first, second and third aspects of the present invention, the shared bus further comprises a synchronization line.

Advantageously, a dramatic reduction in cabling is achieved with the concomitant increase in measuring performance. Service costs are reduced as a result of using state of the art concepts including fiber optics, distributed/modular controls and digital signal processing. The invention also has potential uses in other types of machines besides that described.

These and other objects, features and advantages of the present invention will become more apparent in light of the following detailed description of a best mode embodiment thereof, as illustrated in the accompanying drawing.

BEST MODE FOR CARRYING OUT THE INVENTION

Figure 1:
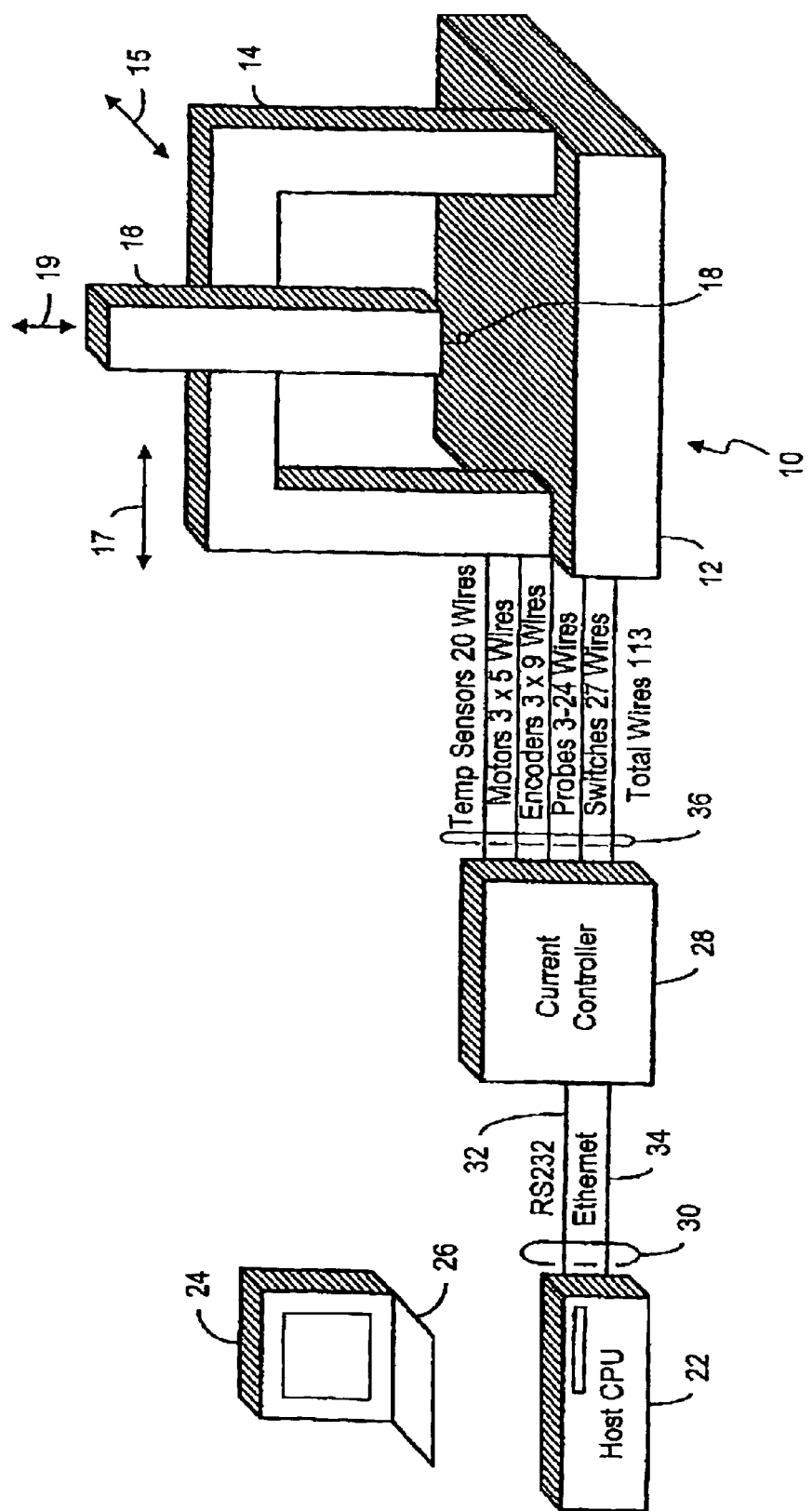
FIG. 1 shows a prior art precision measurement assembly controlled by a controller and a host interconnected by a large plurality of wires.
Figure 2:
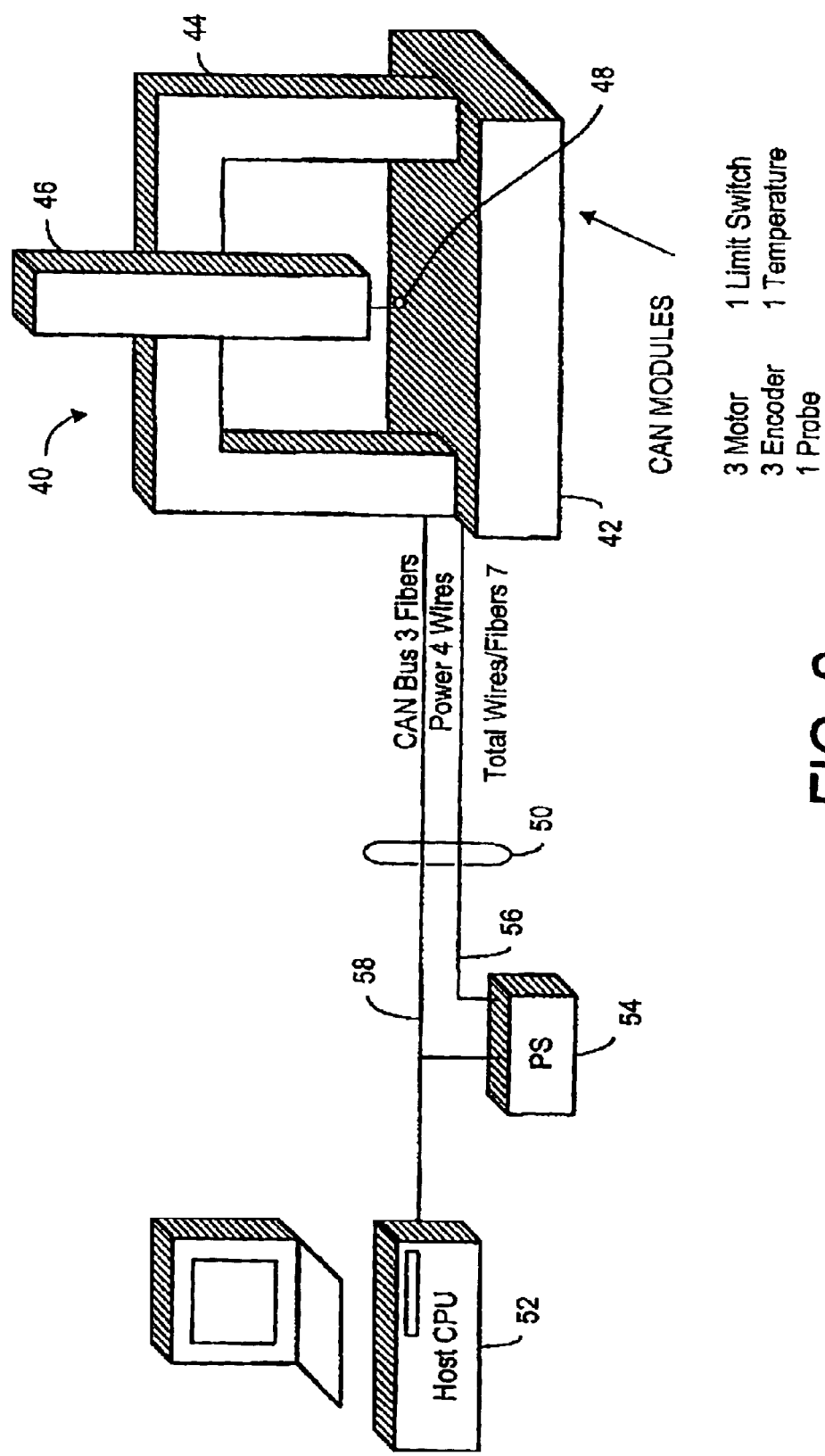
FIG. 2 shows a precision measurement assembly interconnected to a host using a common or shared control bus according to the principles of the present invention.

Referring now to FIG. 2, a precision measurement assembly 40 is shown having a platform 42, a first moveable part 44, in this case a bridge 44, one or more carriers 46 and a probe 48. Not shown but mounted on or within the precision measurement assembly 40 are various modules such as three motor modules for connection to one or more actuator motors each, three encoder modules for connection to one or more encoders each, a probe module for connection to the probe 48, a limit switch module for connection to one or more limit switches and a temperature module for connection to one or more temperature probes. These modules may be interconnected using a standard bus such as a known or custom serial network bus, e.g., a CAN (Controller Area Network) bus as shown or a nonstandard bus. CAN is a known serial bus system with multi-master capabilities according to ISO 11898. Using a shared or common bus allows an interconnection 50 between the assembly 40 and a host 52 to be much reduced in the number of signal lines required. Although the power lines for providing power from a power supply 54 to the assembly 40 will remain the same, such as a total of four power wires as shown by a line 56, the more than 100 wires required in the bundle 36 of FIG. 1 has been reduced, for example, to merely three signal lines 58. These can be electrical wires or optical fibers as shown. The signal lines 50 can be connected to both the host and the power supply as shown or to the host only. Of course, if optical fibers are used, there will be optical-to-electrical and electrical-to-optical interfaces which are not shown in FIG. 2. In this way, the amount of weight carried in the energy track on account of signal wires is much reduced and therefore the accuracy of the precision measurement itself can be improved by reducing any twist caused by changing weight distribution caused by winding and unwinding of the wires in the energy track as the bridge moves with respect to the platform.

Figure 3:
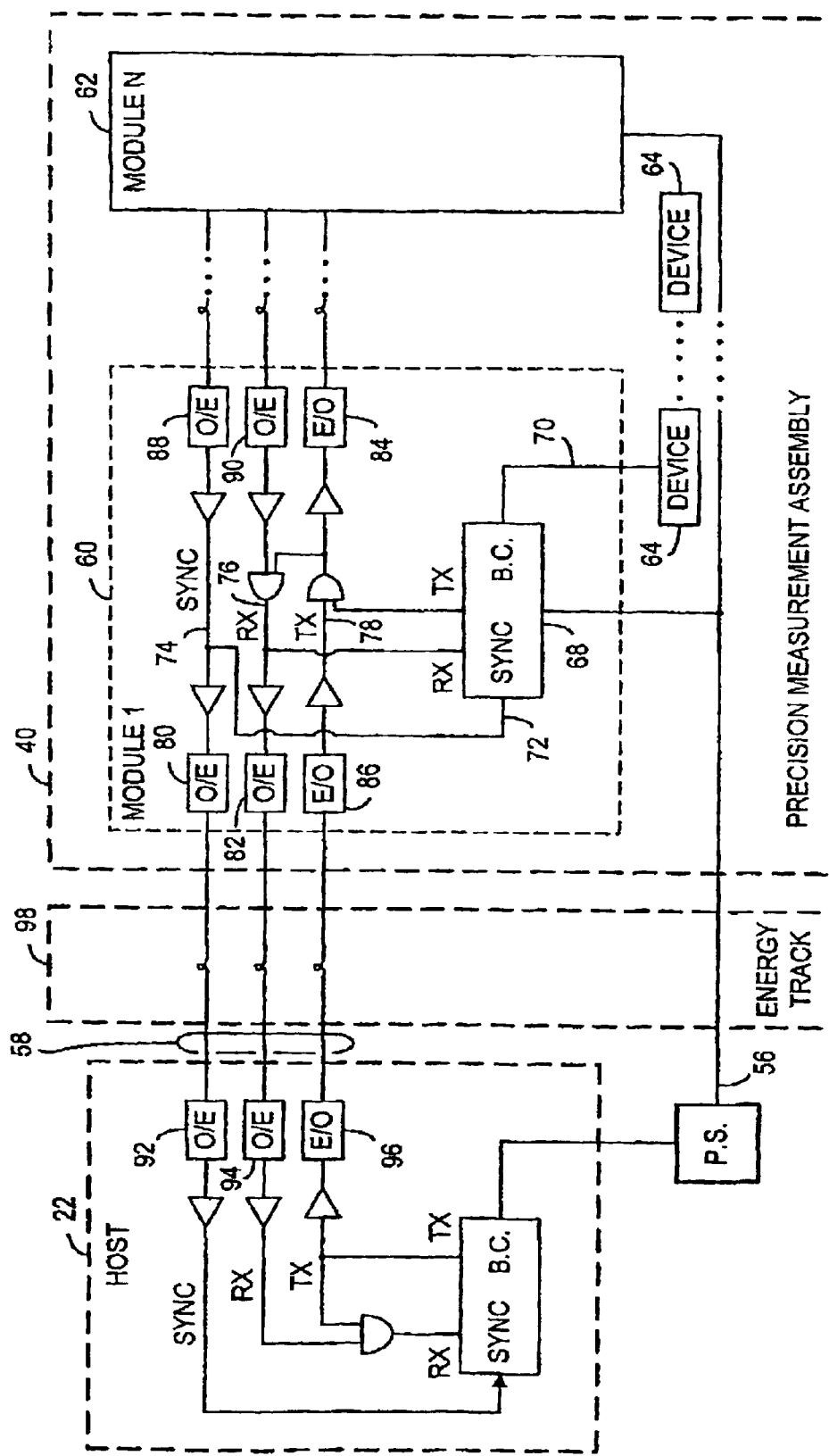
FIG. 3 shows a schematic block diagram of the host of FIG. 2 interconnected to the precision measurement assembly by means of optical fibers, according to the present invention, with details of one of the modules shown.

Referring now to FIG. 3, details of the host and one of the modules of FIG. 2 are shown along with a shared bus, in this case part electrical and part optical. As mentioned in connection with FIG. 2, the precision measurement assembly 40 includes a plurality of modules 60, . . . , 62 each of which are connected to at least one device 64, . . . , 66 which may be a motor, servo, encoder, probe, limit switch or temperature probe, for example. Regardless of the nature of the device, it can be connected to a bus controller (B.C.) for example the bus controller 68 shown in the module 60 of FIG. 3. A connection line 70 is shown interconnecting the bus controller 68 and the device 64 but such a line may comprise multiple lines to one or multiple devices and may be unidirectional or bidirectional in nature. The bus controller is responsive to a synchronization signal on a line 72 from a sync bus 74 which in this case is a separate sync bus. It is made separate in this case because of the importance of the synchronization and timing of the system. However, it should be realized that the synchronization signal could be time multiplexed on the shared transmit and/or receive signal lines to be described below.

As known in certain shared or common bus protocols such as the CAN protocol, when data is transmitted, no stations are addressed, but instead the content of the message is identified by a designation that is unique throughout the network. The designation defines not only the content but also the priority of the message which is important for bus allocation among competing stations. Each bus controller within each of the modules 60, . . . , 62 in FIG. 3 will include a receive port connected to a common receive bus (RX) and a transmit port connected to a common transmit bus (TX). These common or shared receive and transmit buses 76, 78 are shared in common among all the modules 60, . . . , 62 of the precision measurement assembly 40 as well as the host 22.

According to the present invention, although the internals of each module will typically involve electrical interconnections using wires for the interconnections 70, 72, 74, 76, 78, nonetheless the modules will contain electrical-to-optical converters 80, 82, 84 for converting such electrical signals to optical signals and optical-to-electrical converters 86, 88, 90 for converting received optical signals to electrical signals as shown. Similarly, the host 22 has a plurality of converters including optical-to-electrical converters 92, 94 and an electrical-to-optical converter 96 for similar purposes. In this way, the common electrical bus can be shared by extension using optical fibers along much of its length thereby reducing its overall susceptibility to electromagnetic interference (EMI). This is particularly useful in the energy track 98 and in the interconnections between modules 60, . . . , 62. In this way, not only is the weight and size of the bundle of signals reduced but also the overall susceptibility of the system to EMI.

Referring now to both FIGS. 2 and 3, it will be realized that the devices 64, . . . , 66 will include the multiple motors, encoders, probes, limit switches, temperature probes, servos, etc. mentioned above and will be connected to various modules 60, . . . , 62 shown in FIG. 3. Among these will be a plurality of position sensors mounted on the platform and the bridge for providing sensed position signals having magnitudes which together are indicative of the position of the probe 48 on the surface to be measured. These sensed position signals are provided on the transmit line 78 to the host 22 for processing therein. The host provides actuator control signals on the transmit line 78 to the various modules which interpret the signals to decide whether they are associated with actuators attached to themselves, according to the protocol utilized such as the CAN bus system suited for networking such modules as well as sensors and actuators. Consequently, the common control bus interconnecting the host and the plurality of modules is utilized for communicating control and data signals as shown for actuating the various actuators for moving the bridge part with respect to the platform and the carrier part 46 with respect to the bridge 44 and for receiving sensed position signals from a corresponding plurality of position sensors having magnitudes together indicative of positions of the points contacted by the probe 48 along respective axes of the multiple axes of movement of the probe. These sensed data signals are communicated over the common bus from the associated module or modules to the host for purposes of recordation in finally representing a topological map of the surface of the object being measured.

The above principles for carrying out the present invention as described above in connection with a vertical coordinate measuring machine (CMM) is also applicable to other types of CMMs including known gantry CMMs, shop floor CMMs thin wall, shop floor CMMs prismatic, etc. as well as to other precision measuring instruments or tools having the same problem.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. Apparatus, comprising:
    a precision measurement tool having a stationary platform and a movable part for moving a probe along a surface of an object situated on the platform wherein an actuator for moving said part is mounted on said platform or part and plural actuators are mounted on said movable part for moving said probe;
    a plurality of position sensors mounted on said platform and said part for providing sensed position signals having magnitudes which together are indicative of a position of said probe on said surface; and
    a controller physically connected to the measurement tool by means of a bundle of signal lines for communicating actuator control signals from the controller to the actuators and sensed position signals from the position sensors to the controller, characterized in that
    the bundle of signal lines comprises a common bus shared by the sensed position signals and the actuator control signals.

2. The apparatus of claim 1, characterized in that the bundle of signal lines for communicating actuator control signals and sensed position signals comprises optical fibers.

3. The apparatus of claim 1, characterized in that the common bus comprises a transmit line and a receive line.

4. The apparatus of claim 3, characterized in that the common bus further comprises a synchronization line.

5. The apparatus of claim 4, characterized in that the bundle of signal lines comprising the transmit line, the receive line, and the synchronization line are optical fiber lines.

6. Method for use in communicating control and data signals between a controller and a probe movable along a surface of an object for making physical contact with the surface of the object mounted on a platform part of a measurement assembly and wherein the probe is movable by a part of the measurement assembly, said method comprising the steps of:

utilizing a common control bus interconnecting said controller and a plurality of modules including modules mounted on said part for communicating said control and data signals over said common control bus by transmitting a command signal from said controller over said common control bus for use by a plurality of actuator modules to actuate corresponding actuators for moving said part and said probe in multiple axes according to said command signal for moving said probe in continuous contact with said surface along a path on said surface for providing a data signal having a magnitude indicative of said probe making contact with said surface at selected points along said path on said surface of said object to a probe module, providing a plurality of sensed position signals from a corresponding plurality of position sensor modules, said plurality of sensed position signals having magnitudes indicative of positions of said points contacted by said probe along respective axes of said multiple axes of movement of said probe, and communicating said data signal and said sensed position signals over said common control bus from said probe module and said position sensor modules to said bus for use by said controller in recordation of said sensed data signal.

7. The method of claim 6, further comprising the step of using said sensed position signals in a closed loop control of said movement of said probe.

8. The method of claim 6, wherein said common control bus comprises a transmit line and a receive line.

9. The method of claim 8, wherein interconnection of said transmit line and said receive line between said modules and said controller is made by optical fibers.

10. The method of claim 6, wherein interconnection between said modules and said controller is made by optical fibers.

11. The method of claim 8, wherein said common control bus further comprises a synchronization line.

12. The method of claim 9, wherein said common control bus further comprises a synchronization line and interconnection of said synchronization line between said modules and said controller is made by optical fibers.

13. Apparatus, comprising:

a platform for supporting an object mounted thereon for measurement of a surface thereof;

a probe for moving in multiple axes along a path on the surface of the object for providing a sensed signal having a magnitude indicative of physical contact with said surface as well as positions of said points along said path along an axis of said probe;

a part movable on said platform for said moving the probe along at least one of said multiple axes along said path;

a probe module, responsive to said sensed signal for providing said sensed signal to a shared bus according to a preselected protocol;

a plurality of actuator modules including a corresponding plurality of probe actuators mounted on said moveable part, responsive to respective probe actuator control signals provided according to said protocol on said shared bus, for moving said probe on said moveable part along said path;

at least one moveable part actuator, responsive to a moveable part actuator signal, for moving said moveable part on said platform for said moving said probe in said at least one of said multiple axes along said path;

a plurality of position sensor modules connected to a corresponding plurality of position sensors for providing sensed position signals on said shared bus according to said protocol having magnitudes indicative of positions of said points contacted by said probe during movement of said probe along said path; and a controller for executing a stored program for providing said respective probe actuator control signals and said bridge actuator signal and responsive to said sensed position signals over said shared bus according to said preselected protocol for storing said sensed signals together representing a topological map of said surface.

14. The apparatus of claim 13, wherein said controller is responsive to said sensed position signals provided over said shared bus according to said preselected protocol for comparison to a corresponding one or more of said probe actuator control signals for providing one or more corresponding error signals to one or more of said plurality of probe actuators.

15. The apparatus of claim 13, wherein said shared bus comprises a transmit line and a receive line.

16. The apparatus of claim 15, wherein interconnection of said transmit line and said receive line between said probe module, said actuator modules, said position sensor modules, and said controller is made by optical fibers.

17. The apparatus of claim 13, wherein a portion of said shared bus comprises optical fibers interconnecting said probe module, said actuator modules and said controller.

18. The apparatus of claim 15, wherein said shared bus further comprises a synchronization line.

19. The apparatus of claim 16, wherein said shared bus further comprises a synchronization line and interconnection of said synchronization line between said modules and said controller is made by optical fibers.

* * * * *